United States Patent [19]

Akane

[11] Patent Number: 4,784,597
[45] Date of Patent: Nov. 15, 1988

[54] APPARATUS FOR PRODUCING BLOWN FILM

[75] Inventor: Saburo Akane, Toyama-shi, Japan

[73] Assignee: Super Bag Company, Ltd., Tokyo, Japan

[21] Appl. No.: 892,077

[22] Filed: Aug. 1, 1986

[30] Foreign Application Priority Data

Aug. 10, 1985 [JP] Japan .................... 60-176765
Aug. 10, 1985 [JP] Japan .................... 60-176766

[51] Int. Cl.$^4$ ............................ B29C 47/90
[52] U.S. Cl. ...................... 425/326.1; 264/565; 264/566; 425/72.1; 425/387.1; 425/392; 425/403
[58] Field of Search ............ 264/565, 566, 503, 209.2; 425/326.1, 72 R, 393, 71, 66, 392, 387.1, 380, 379 R, 72.1, 403

[56] References Cited

U.S. PATENT DOCUMENTS

| 3,280,429 | 10/1966 | Haley | 425/379 R |
| 3,317,951 | 5/1967 | Hureau | 425/71 |
| 3,395,205 | 7/1968 | Petzetakis | 264/209.2 |
| 3,904,334 | 9/1975 | Yazawa et al. | 425/387.1 |
| 4,204,819 | 5/1980 | Ushioda et al. | 425/72 R |
| 4,251,199 | 2/1981 | Imaizumi et al. | 425/72 R |
| 4,279,580 | 7/1981 | Hayashi et al. | 425/326.1 |

FOREIGN PATENT DOCUMENTS

| 53-74568 | 7/1978 | Japan | 425/380 |
| 58-42431 | 3/1983 | Japan | 425/72 R |
| 58-188626 | 11/1983 | Japan | 264/565 |
| 60-101022 | 6/1985 | Japan | 264/565 |

Primary Examiner—Jeffery Thurlow
Attorney, Agent, or Firm—Wenderoth, Lind & Ponack

[57] ABSTRACT

A bubbler stabilizer for a blown film extrusion apparatus has a shaft mounted on an extrusion die of the apparatus, a pair of supporting members mounted on the shaft and spaced a predetermined distance from each other, and a plurality of lengths of coil spring extending between the peripheral portions of the supporting members with the lengths being spaced peripherally at intervals of a predetermined size around the supporting members. The coil spring lengths extend in a skew position relative to the axis of the shaft.

13 Claims, 8 Drawing Sheets

FIG. 3
FIG. 4
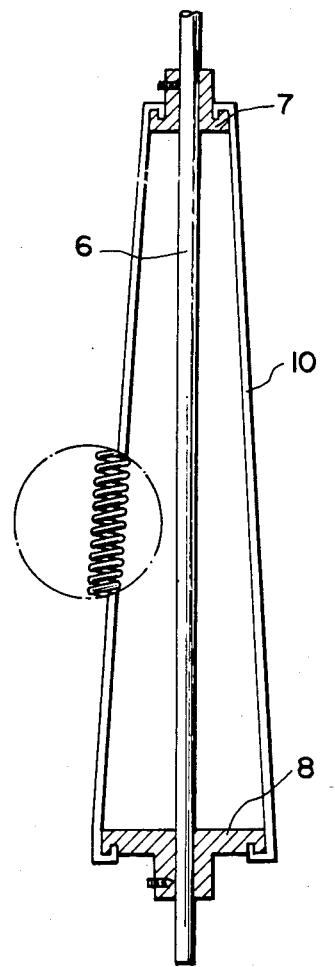
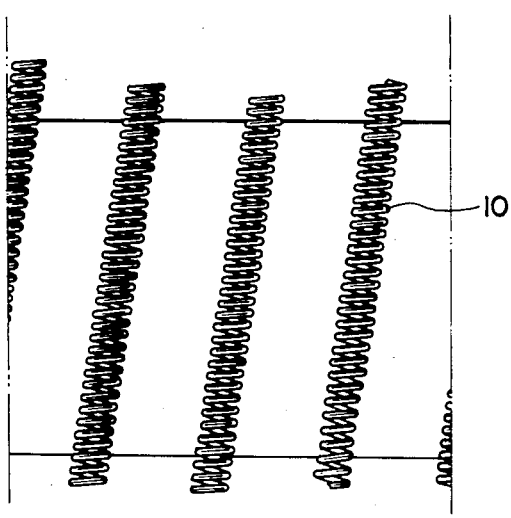

APPARATUS FOR PRODUCING BLOWN FILM

BACKGROUND OF THE INVENTION

1. Field of the Invention

The present invention relates to a method and apparatus for producing a blown film, and more particularly to a method and apparatus in which an improved bubble stabilizer is employed.

2. Description of the Prior Art

In a blown-film extrusion for producing a tubular resin film, it is important to prevent molecular orientation and thickness deviation from occurring in the film in order to produce a uniform film, which molecular orientation and thickness deviation result from material deformations occurring in flow or extension of the resin material which is extruded from a die in a molten state and solidified. As shown in FIG. 11, one such preventive measure is disclosed in a blown-film extrusion described in Japanese Patent Publication No. 55-2180 in which a bubble is extruded from a die while being brought into contact with a small-diameter bubble stabilizer which projects from a surface of the die.

However, in such conventional blown-film extrusion, since a tubular bubble stabilizer employing a bubble stabilizer lacks cushioning properties in its portion contacting a tubular molten material, such stabilizer can not adapt itself to the changes of the bubble's shape corresponding to the changes in room temperature, cooling effect, resin temperature, amount of the resin extruded, thickness of the bubble and extrusion speed of the film, so that the extruded film is often broken by occurrence of knocking. In addition, in the conventional blown-film extrusion, the molten resin extruded from the die is cooled by cool air supplied from an air ring while being extruded into a tubular molten resin element. However, such cooling action depending only on the cooling through the air ring restricts the amount of the resin extruded and therefore is not adequate in increasing the amount of production the film per hour.

Further, in the conventional blown-film extrusion, since the bubble stabilizer is fixed in its size and shape, it is necessary to provide various tubular bubble stabilizers having various sizes and various shapes corresponding to various sizes and thickness of the blown films to be produced. Consequently, various types of dies are required which results in a cumbersome maintenance which is another problem inherent in the conventional blown-film extrusion.

SUMMARY OF THE INVENTION

It is an object of the present invention to provide a blown-film extrusion method for thermoplastic synthetic resin, in which a tubular film extruded from the die is transferred while being brought into contact with a bubble stabilizer constructed of a plurality of filament elements which axially extend between the die and a frost line of the film and are arranged in a substantially cylindrical shape.

It is another object of the present invention to provide a blown-film extrusion apparatus in which a pair of supporting members are mounted on a supporting axle so as to be separated from each other by a certain distance, which supporting axle is fixed to a die, between which supporting members are provided a bubble stabilizer constructed of a plurality of filament elements which are mounted on peripheral edge portions of the supporting members at intervals of a predetermined distance in the circumferential directions of the supporting members in an expanded condition.

According to the present invention, the filament elements extend between the supporting members in an expanded condition through engaging means provided on both of the supporting members.

According to the present invention, the filament elements may be substantially parallel to the axis of the supporting axle, or may be oblique to such axis.

The engaging means may be a plurality of holes provided in a peripheral edge portion of each of the supporting members, or may be a plurality of U-shaped holes the opening of each of which is directed outward, which U-shaped holes are provided in the peripheral edge portions of the supporting members, or may be a plurality of hook-like projecting tongues provided in the peripheral edge portions of the supporting members.

The plurality of the filament elements may separately extend between the supporting members in an expanded condition.

Further, the filament elements may constitute an elongated endless-ring type single element as a whole, to make it possible that such single element extends between the supporting members through the engaging means in an expanded condition, the number of which endless-ring type elements may be more than one.

Preferably, the filament elements are constructed of resilient material, for example such as wire, filaments of hard synthetic resin materials, coil springs and rubber strings.

The coil springs may be double-coil springs.

The supporting members may be disks or rings.

Of the supporting members such as the disks or the rings, the one near the die has a small diameter so that the thus formed bubble stabilizer preferably has a conical shape.

Of the supporting members, one or both of them is preferably rotatable about the support-axle and/or one or both of is be preferably movable in a longitudinal direction of the supporting axle.

Other elements of the bubble stabilizer and the blown-film extrusiion apparatus may be conventional ones.

BRIEF DESCRIPTION OF THE DRAWINGS

FIG. 3 is a cross-sectional view taken along the line B—B of FIG. 2;

FIG. 4 is an enlarged view of a portion between the lines A—A and A'—A' of FIG. 2;

FIGS. 5 and 6 are longitudinal sectional views of another embodiment of the bubble stabilizer of the blown-film extrusiion apparatus of the present invention, which embodiment is different from that shown in FIG. 1; in which FIG. 5 is a view for explaining the longitudinal section of the bubble stabilizer; and FIG. 6 is a view showing in section the essential parts of the blown-film extrusion apparatus of the embodiment.

DESCRIPTION OF THE PREFERRED EMBODIMENTS

The present invention will be hereinbelow described in detail with reference to the drawings showing the embodiments of the present invention, but which are not intended to limit the present invention.

Figure 1:
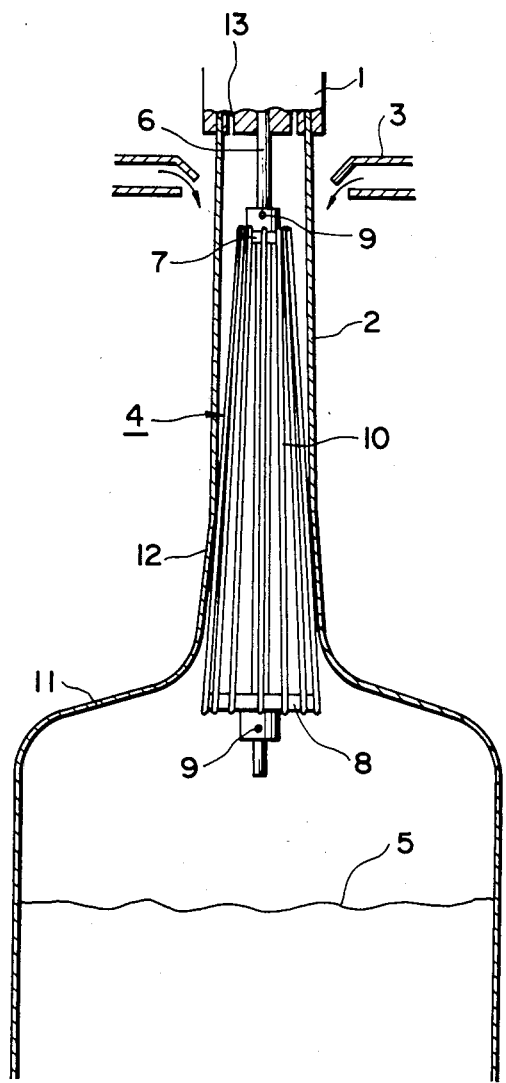
FIG. 1 is a longitudinal sectional view of the blown-film extrusion apparatus of the present invention.

In FIG. 1, the reference numeral 1 denotes a die; 2 a tubular resin film; 3 an air ring; and 4 a bubble stabilizer provided between the die 1 and the position of the frost line 5 of the film 2.

In the bubble stabilizer 4, a supporting shaft 6 is fixed to the die 1, to which supporting axle 6 are respectively fixed by screws 9 a pair of supporting disks 7 and 8 one of which is a small-diameter supporting disk 7 disposed in a position near the die 1 and the other of which is a large-diameter supporting disk 8, and each of which is provided with a boss.

As shown in FIG. 3 in the clearest manner, a coil spring 10 which is made of stainless steel and acting as a filament element extends between the supporting disks 7 and 8 in parallel to the axis of the supporting shaft 6.

These supporting disks 7 and 8 can be rotated about the supporting shaft 6 and longitudinally slidable along the shaft 6 by slightly releasing the screws 9.

Figure 2:
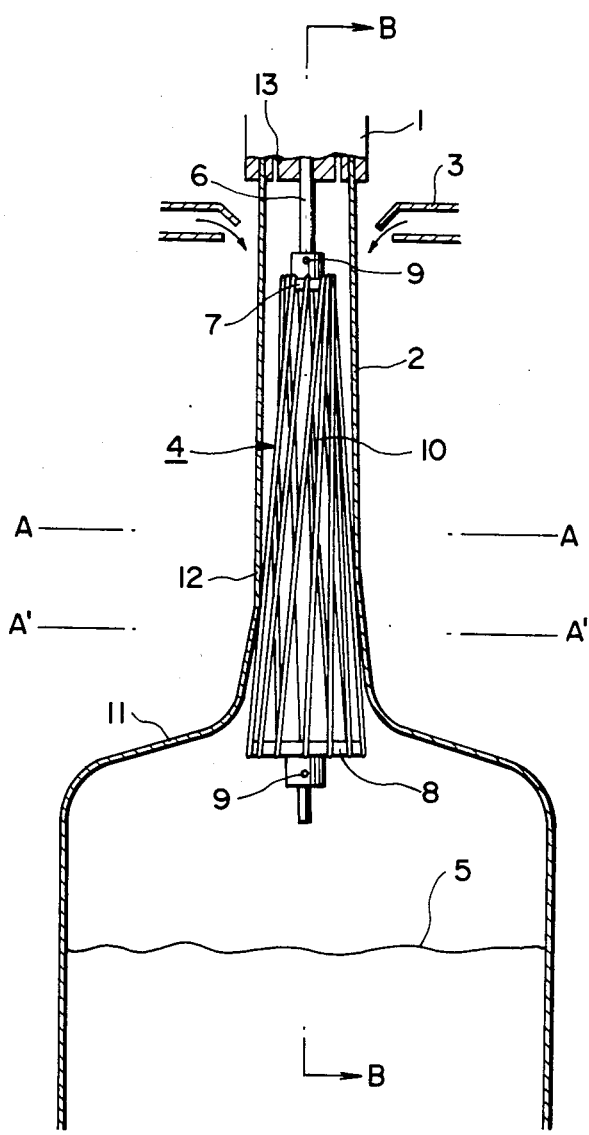
FIG. 2 is a view similar to FIG. 1, in which the bubble stabilizer has a different construction from the one shown in FIG. 1.

Since the filament element 10 is constructed of the coil spring, it is expandable to make it possible to shift one of the supporting disks 7 or 8 relative to the other thereof about the axis of the supporting shaft 6, so that, as shown in FIG. 2, the filament element 10 may be tilted relative to the axis of the supporting shaft 6, i.e., the cylindrical wall surface of the bubble stabilizer 4 constructed of at least one of the filament elements 10 is put into a twisted or skew condition.

Although it is not shown in the drawings, it is possible to adjust the distance between the supporting disks 7 and 8 so as to change the frusto-conical shape of the bubble stabilizer 4.

Thus, it is possible to provide various sizes and shapes by the use of a single bubble stabilizer 10, to make it possible to adequately select the optimum conditions of the blown-film extrusion by adjusting the tilting angle in the circumferential direction, the radius of the conic section, and the resilient force of the filament element 10.

As shown in FIG. 1, the filament element 10 contacts the tubular resin film 2 through a tiny contact area. In addition, since the film 2 curves naturally to contact the filament element 10 and is separated from the latter 10 while being expanded, the expansion of the film 2 does not encounter resistance, which makes it possible conduct such expansion smoothly. In such expansion of the film 2 or bubble, the bubble is put under the influences of the room temperature, cooling action, resin temperature, amount of the resin extruded, thickness of the bubble, extrusion speed of the film 2 and like factors and may be deformed in a complex manner so that the bubble changes in its outer diameter and its position of contact with the filament element 10 in the bubble portion 12 immediately before a funnel-shaped enlarged portion 11 of the tubular resin film 2. However, such changes in the bubble can be immediately absorbed by the filament element 10 due to its resiliency, which makes it possible to resolve the breakage problem of the film 2 due to the knocking thereof. In addition, as shown in the drawings, the air supplied into the tubular resin film 2 through an air blowing port 13 prevents the tubular resin film 2 from being heated to a high temperature when the air passes through the funnel-shaped enlarged portion 11 so as to support the cooling action of the air ring 3 inside the tubular resin film 2, to make it possible to increase the amount of molten resin extruded, whereby the amount of the film 2 produced per hour is increased.

In addition, since the contacting area is tiny, the tubular resin film can substantially keep its thickness uniform even when there is an uneven thermal conductivity in the film 2 during its extrusion, so that there is no fear of producing a defective part of the film or a defective product.

When the blown film 2 is produced by the use of the blown-film extrusion apparatus of the present invention, the tubular resin film 2 extruded through the die 1 is brought slightly into contact with the filament element 10 of the bubble stabilizer 4 at an inner surface of its portion 12 immediately before the funnel-shaped enlarged portion 11 of the film 2. Consequently, particularly when the filament element 10 is tilted relative to the axis of the supporting shaft 6, the inner surface portion of the tubular resin film 2 reaching the above portion 12 is kneaded obliquely by the filament element 10 to give uniformity to the film 2 in its polymer orientation in the lateral and longitudinal directions. At this time, the thickness of the film 2 is simultaneously evened through such oblique kneading action of the filament element 10 while being transferred to the funnel-shaped enlarged portion 11, so that the film 2 is extended in the lateral and longitudinal directions, whereby the mechanical properties of the film 2, for example such as tensile strength, tear propagation strength, thickness and the like, are evened throughout the film.

Figure 5:
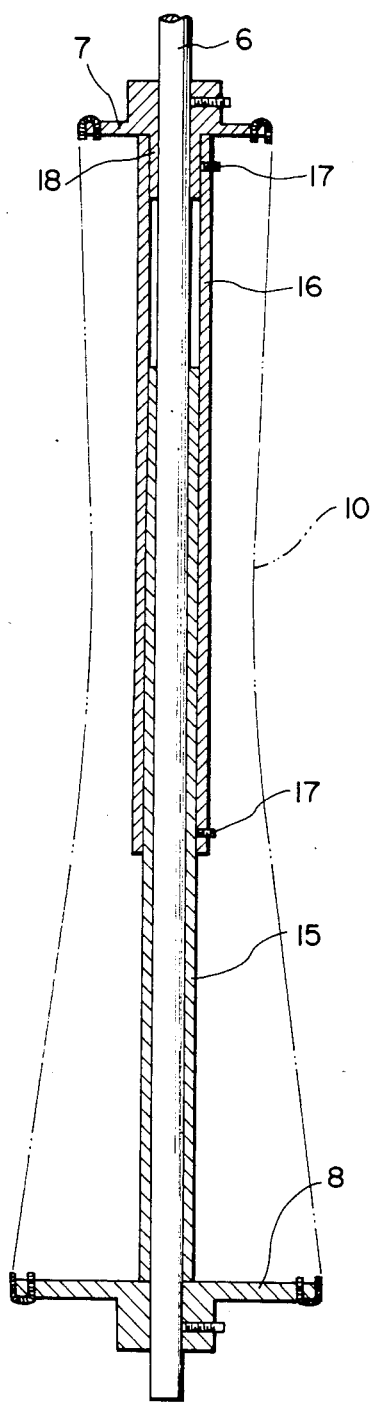
Figure 6:
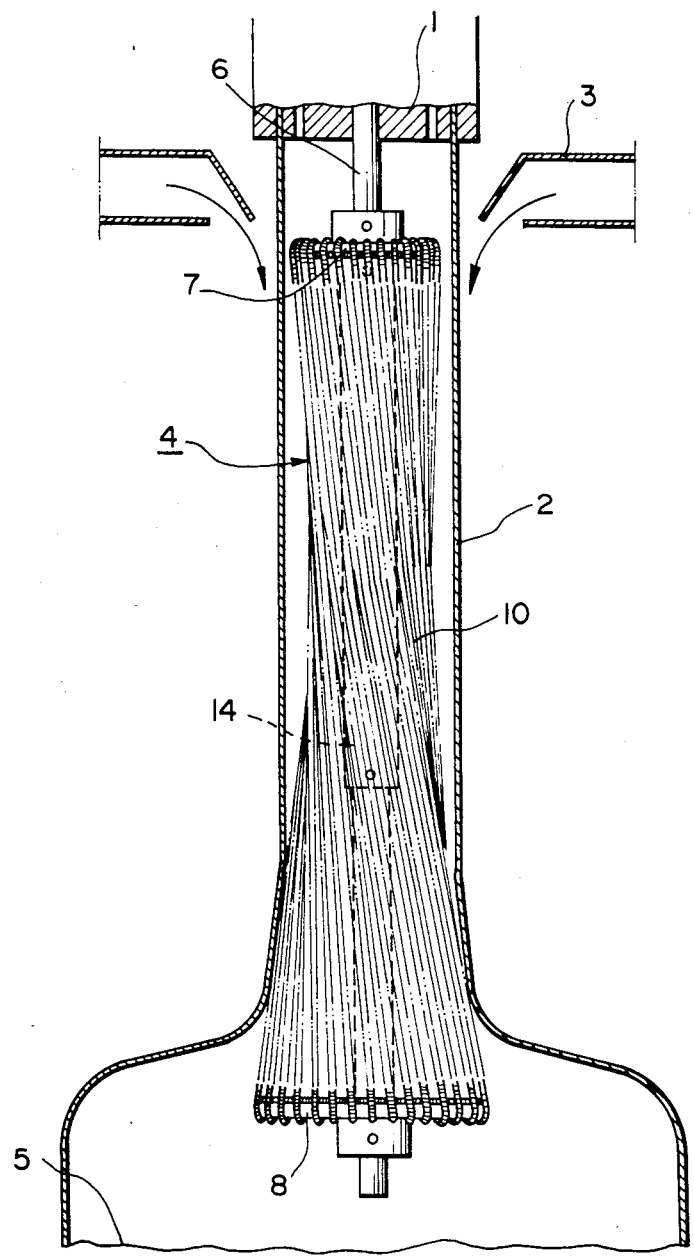

In FIGS. 5 and 6, there is shown another embodiment of the present invention, which is different from that shown in FIGS. 1 and 2.

In such embodiment, in order to adjust the distance between the upper and lower supporting disks 7 and 8, a telescopic cylinder element 14 is provided in the supporting shaft 6 between these supporting disks 7 and 8. The telescopic cylinder element 14 is constructed of an inner cylinder 15 abutting against the lower supporting disk 8 and an outer cylinder 16 abutting against the upper supporting disk 7 to keep these supporting disks 7 and 8 in their adjusted positions. The cylinder element 14 is fixed to the supporting disk 7 by screw 17. The upper supporting disk 7 is provided with a rib 18 which is inserted into the outer cylinder 16 of the cylinder element 14 one side of which is fixed to the upper supporting disk 7 at the rib 18 by the screw 17.

Figure 7:
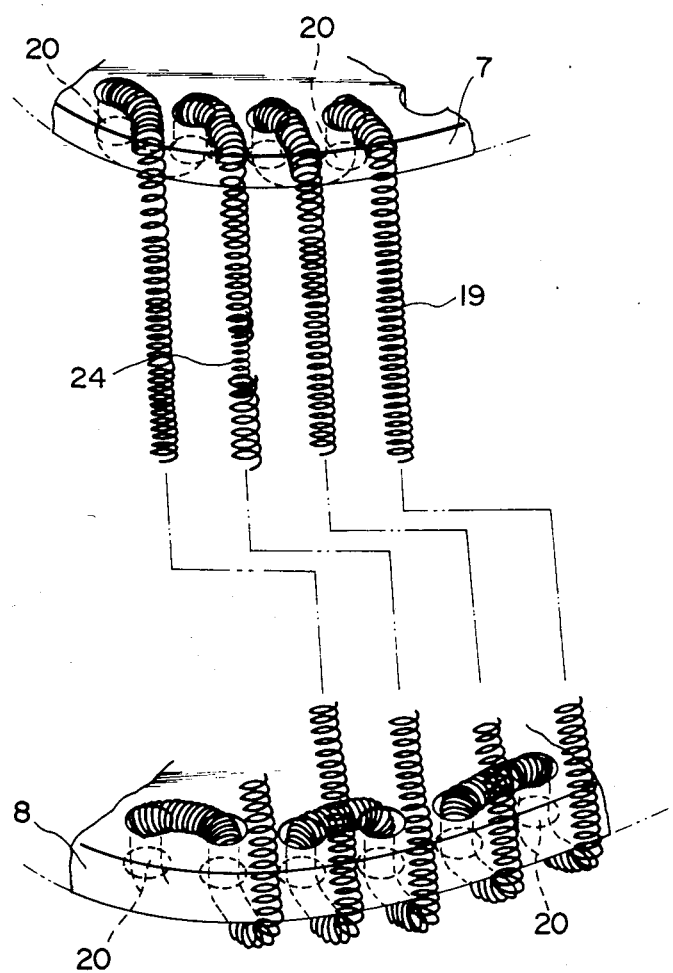
FIG. 7 is a perspective view of the bubble stabilizer, showing one embodiment of the engaging means for the filament elements of the supporting disks, and showing the extended condition of the elongated endless ring of the bubble stabilizer of the present invention.

In FIG. 7, there is shown another embodiment of the filament element 10, i.e., an elongated endless coil spring 19. In this embodiment, a plurality of circular holes 20 acting as the engaging means for the endless spring 19 are provided in a peripheral edge of each of the upper and lower supporting disks 7 and 8 at intervals of a certain distance. The elongated endless spring 19 passes through one circular hole 20 from the outside of the supporting disks 7 and 8, i.e. the surfaces which face away from each other, to the inside of the disks, i.e. the surfaces which face each other, and then passes through another circular hole 20 adjacent to the first one from the inside of the supporting disks 7 and 8 to the outside of the disks. The elongated endless spring 19 thus passed through the circular holes 20 of one of the supporting disks 7 and 8 is then extended over the outside edge of the one supporting disk and then toward the other of the supporting disks 7 and 8 so as to be passed through the circular holes 20 of the other of the supporting disk 7 and 8 in the same manner as in the case of the circular holes 20 of the first one of the supporting disks 7 and 8, whereby such passing operation of the elongated endless spring 19 is repeated with respect to the circular holes 20 to make it possible to extend the elongated endless spring 19 between the supporting disks 7 and 8 in an expanded condition so as to form a cylindrical wall surface of the bubble stabilizer 4.

Figure 9:
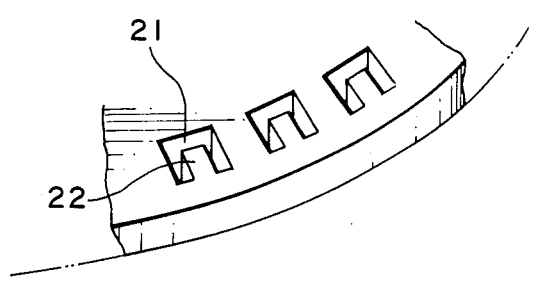
FIGS. 9 and 10 are perspective views of other engaging means of the supporting disks, which are different from that shown in FIG. 7, respectively.
Figure 11:
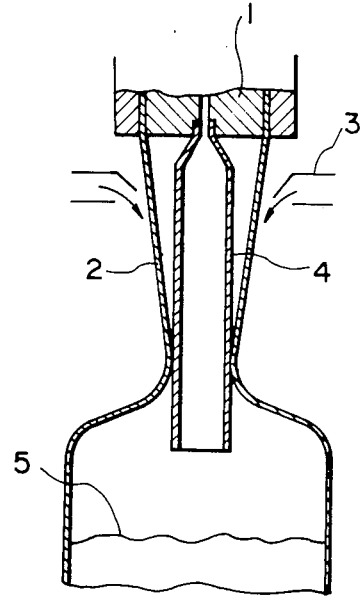
FIG. 11 is a longitudinal sectional view of a conventional blown-film extrusion apparatus provided with the bubble stabilizer.

The engaging means provided in the upper 7 and lower 8 supporting disks, which are the circular holes 20, may be replaced with another embodiment of the engaging means as shown in FIG. 9 in which the circular holes 20 are replaced with U-shaped holes 21 the opening of each of which is directed outward to form a tongue portion 22 which engages with the filament element 10, i.e., the elongated endless spring 19.

Figure 10:
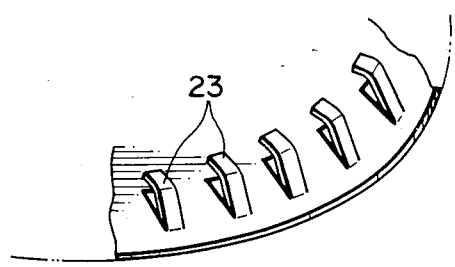

In addition, as shown in FIG. 10, the circular holes 20 may be replaced with another embodiment of the engaging means, which takes the form of a hook-like tongue 23 provided on the outer surfaces of the supporting disks 7 and 8 and directed radially inward of the disks.

These embodiments make it possible for the upper 7 and lower 8 supporting disks to be rotatably shifted about the supporting shaft 6 relative to each other to twist the cylindrical wall surface formed by the filament element 10, or for the upper 7 and lower 8 supporting disks to be axially moved relative to each other to change the form of the bubble stabilizer 4 as is in the former embodiments of the present invention.

Figure 8:
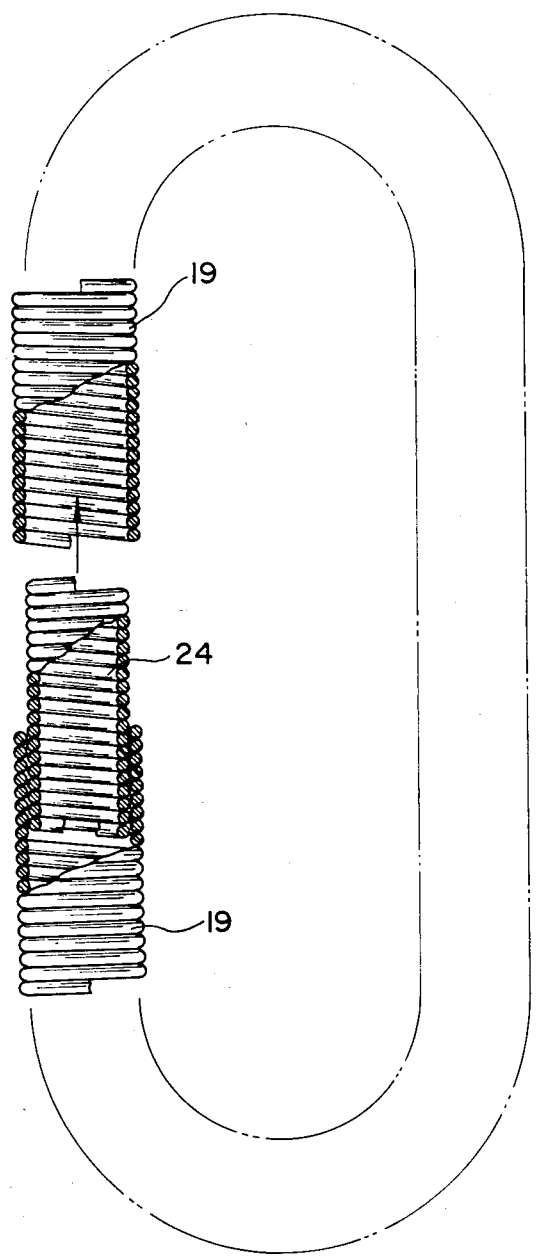
FIG. 8 is a partial sectional view of the elongated coil spring, showing the connection of the ends.

Further, as shown in FIGS. 7 and 8, when the elongated endless spring 19 is extended between the upper and lower supporting disks 7 and 8 in an expanded condition, it is possible to form such endless spring 19 by press-fitting a short coil spring 24 into the opposite ends of the spring 19 in which short coil spring 24 is slightly larger in its outer diameter than the inner diameter of the coil spring constituting such endless spring 19, to make it possible to provide such endless spring 19 acting as the filament element 10 without causing any deterioration in resiliency and flexibility of the spring 19.

In the bubble stabilizer 4 provided with the above-described engaging means, it is possible to easily mount and replace the filament element 10 according to the present invention.

What is claimed is:
1. A bubble stabilizer for a blown film extrusion apparatus, comprising:
 a shaft adapted to be mounted on an extrusion die of the apparatus;
 a pair of supporting members mounted on said shaft and spaced a predetermined distance from each other; and
 a filament means constituted by a plurality of lengths of coil spring extending between the peripheral portions of said supporting members, the lengths being spaced peripherally at intervals of a predetermined size around said supporting members, said coil spring lengths extending in a skew position relative to the axis of said shaft.

2. A bubble stabilizer as claimed in claim 1 in which said supporting members have different diameters, the one closer to the extrusion die being smaller than the one remote therefrom.

3. A bubble stabilizer as claimed in claim 1 in which said lengths of coil spring are separate coil springs.

4. A bubble stabilizer as claimed in claim 1 in which said lengths of coil spring are connected to each other in a single elongated endless coil spring extended between said supporting members, and further comprising engaging means on said supporting members with which said endless coil spring is engaged for holding the endless coil spring on said supporting members.

5. A bubble stabilizer as claimed in claim 1 in which said supporting members are supporting disks.

6. A bubble stabilizer as claimed in claim 1 in which said supporting members are supporting rings.

7. A bubble stabilizer as claimed in claim 1 in which said supporting members are rotatably shiftably mounted on said shaft for being rotatably shiftable around the axis of said shaft.

8. A bubble stabilizer as claimed in claim 1 in which said supporting members are shiftably mounted on said shaft for being shiftable along said shaft.

9. A bubble stabilizer as claimed in claim 1 in which said supporting members are rotatably and lengthwise shiftably mounted on said shaft for being rotatably shiftable around the axis of said shaft and being shiftable along said shaft.

10. A bubble stabilizer as claimed in claim 1 in which said supporting members have engaging means around the periphery thereof, and said lengths of coil spring are connected to said supporting members by engaging with said engaging means.

11. A bubble stabilizer as claimed in claim 10 in which said engaging means comprises a plurality of circular holes in the peripheral edge portions of said supporting members through which said lengths of coil spring extend for engagement with said supporting members.

12. A bubble stabilizer as claimed in claim 10 in which said engaging means comprises a plurality of outwardly directd U-shaped holes in the peripheral edge portions of said supporting members.

13. A bubble stabilizer as claimed in claim 10 in which said engaging means comprises a plurality of hook-like tongues provided along the peripheral edge portions of said supporting members.

* * * * *